United States Patent [19]

Audebert

[11] Patent Number: 5,579,281
[45] Date of Patent: Nov. 26, 1996

[54] METHOD OF IMPROVING AN ESTIMATE OF SEISMIC WAVE PROPAGATION VELOCITIES BY FOCUSING ANALYSIS

[75] Inventor: Franois Audebert, Paris, France

[73] Assignee: Compagnie Generale De Geophysique, Massy, France

[21] Appl. No.: 189,313

[22] Filed: Jan. 31, 1994

[30] Foreign Application Priority Data

Feb. 1, 1993 [FR] France ................................. 93 01029

[51] Int. Cl.$^6$ .............................................. G01V 1/34
[52] U.S. Cl. ............................. 367/50; 367/73; 364/421
[58] Field of Search ...................... 367/50, 73; 364/421

[56] References Cited

U.S. PATENT DOCUMENTS 5,235,555  8/1993  Albertin ................................. 367/53

FOREIGN PATENT DOCUMENTS 2230861  10/1990  United Kingdom .

OTHER PUBLICATIONS

Geophysics, vol. 57, No. 12, Dec. 1992, pp. 1608–1622, S. Mackay et al., "Imaging and velocity estimation with depth--focusing analysis".
Proceedings Of The IEEE, vol. 72, No. 10, Oct. 1984, pp. 1302–1315, Gazdag, et al., "Migration of Seismic Data".
Geophysics, vol. 54, No. 6, Jun. 1989, pp. 718–729, K. Al–Yahya, "Velocity analysis by iterative profile migration".
Geophysical Prospecting, vol. 37, No. 8, Nov. 1989, pp. 925–958, Blacquiere et al., "3D Table–driven migration".
Moorehead et al, 53rd EAEG Mtg; May 26, 1991, pp. 606–607; abst. only herewith.
Sasaki, Y, 59th Annu. Soc. Explor. Geophys. Int. Mtg., Oct. 29, 1989, vol. 1, pp. 165–167; abst. only herewith.
Loenenthal et al, 60th Annu SBG Int. Mtg., Sep. 23, 1990, vol. 2, p. 1661; abst. only herewith.
Li, Z., 60th Annu. SBG Mtg. Int., Sep. 23, 1990, vol. 1, pp. 94–97: abst only herewith.

*Primary Examiner*—Nelson Moskowitz

[57] ABSTRACT

The invention relates to a method of processing seismic data in which a volume of raw focusing data is constituted by downwards extrapolation of seismic data obtained by means of at least one seismic source and of sensors disposed at the surface at regular abscissas along a prospecting section. For a subset of said volume corresponding to a given extrapolation depth and for a contiguous set of abscissas along the prospecting section, zero offset downwards migration is performed to a first set of depths greater than said extrapolation depth in order to constitute a first block of focusing analysis migrated data, and similarly inverse zero offset migration is performed upwards to a second set of depths less than said extrapolation depth in order to constitute a second block of focusing analysis migrated data. The first and second blocks of data are united for each extrapolation depth, and a focusing panel is constructed which is subsequently processed by focusing analysis in order to obtain a better estimate of the seismic wave propagation velocities underground.

12 Claims, 5 Drawing Sheets

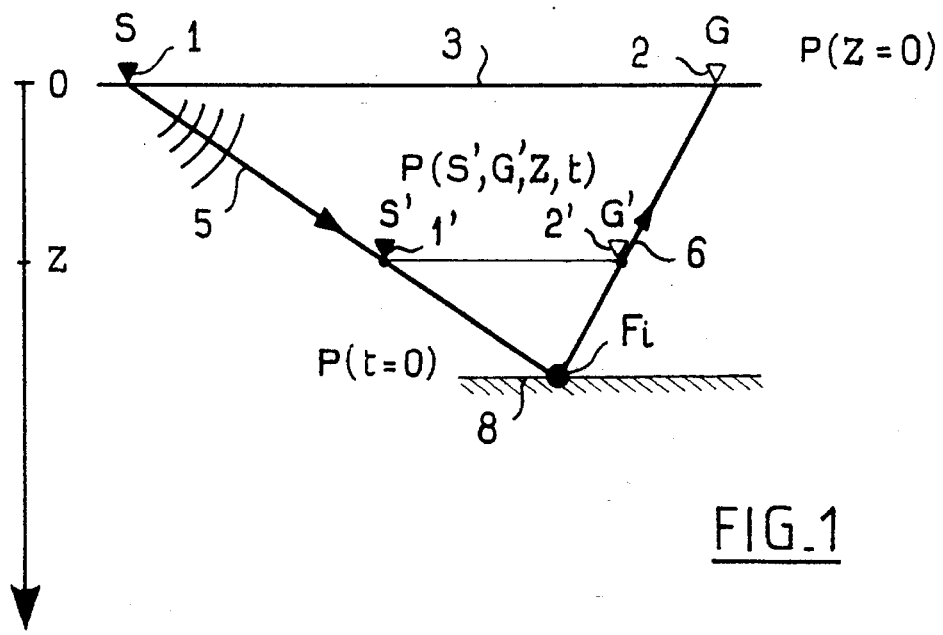
FIG_1
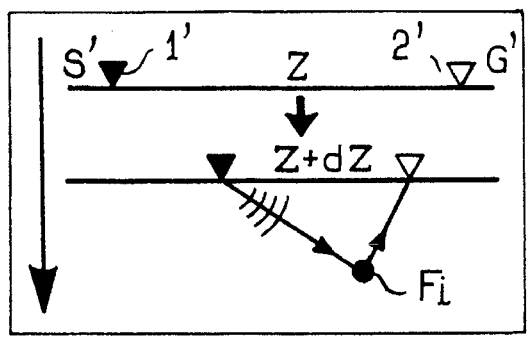
FIG_2
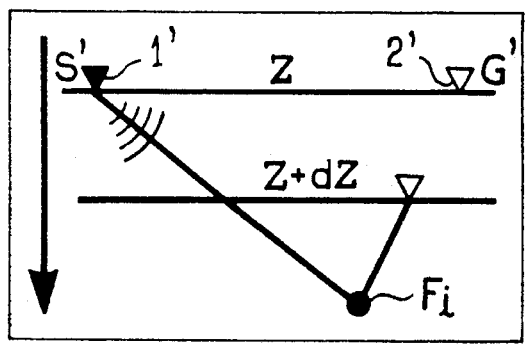
FIG_3
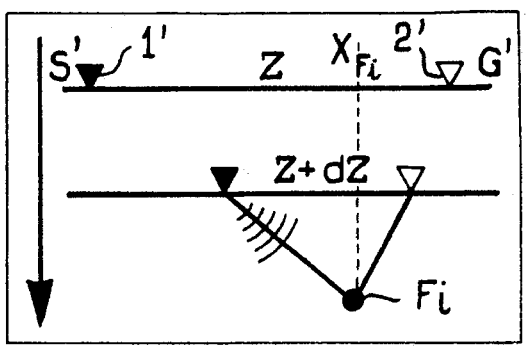
FIG_4

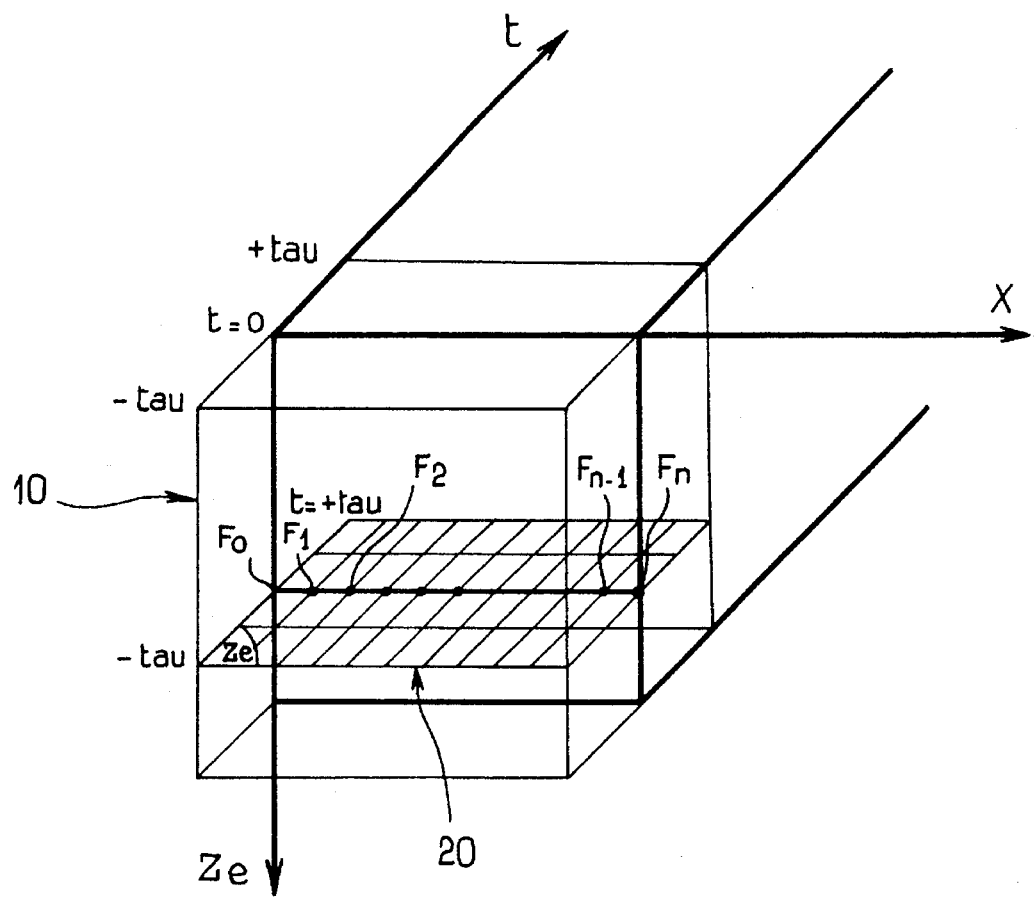
FIG.\_5
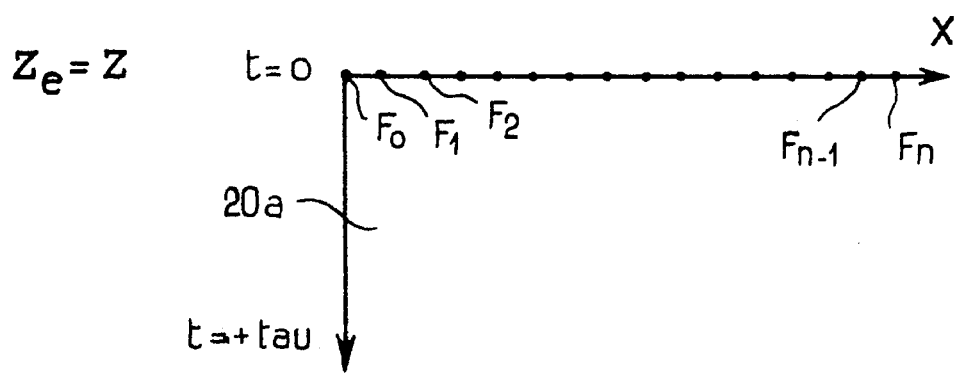
FIG.\_6

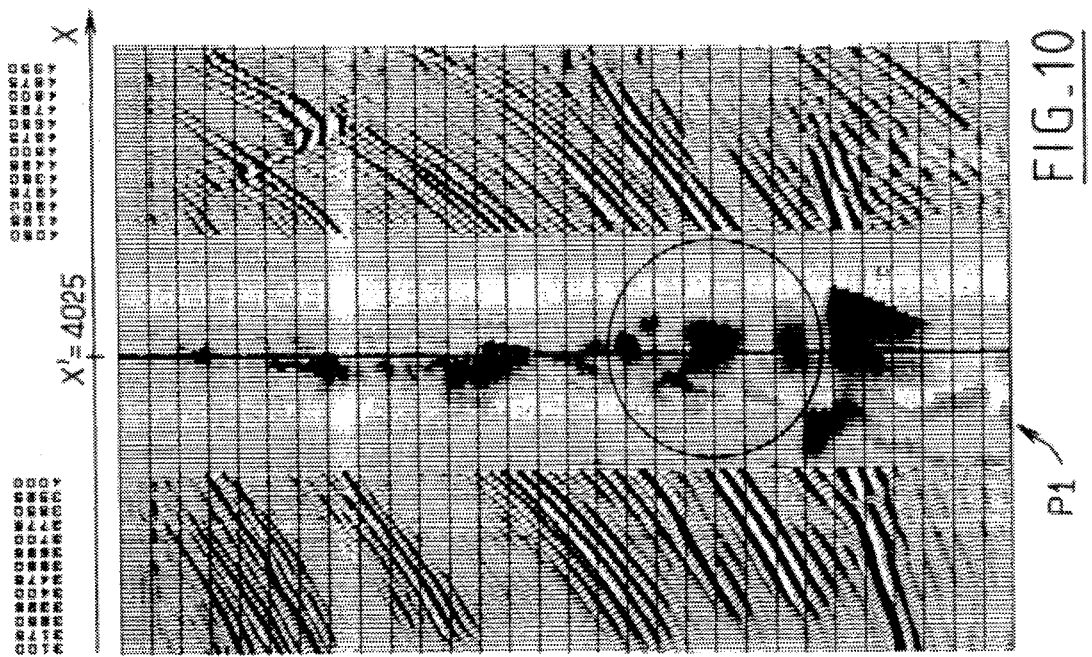
FIG_10
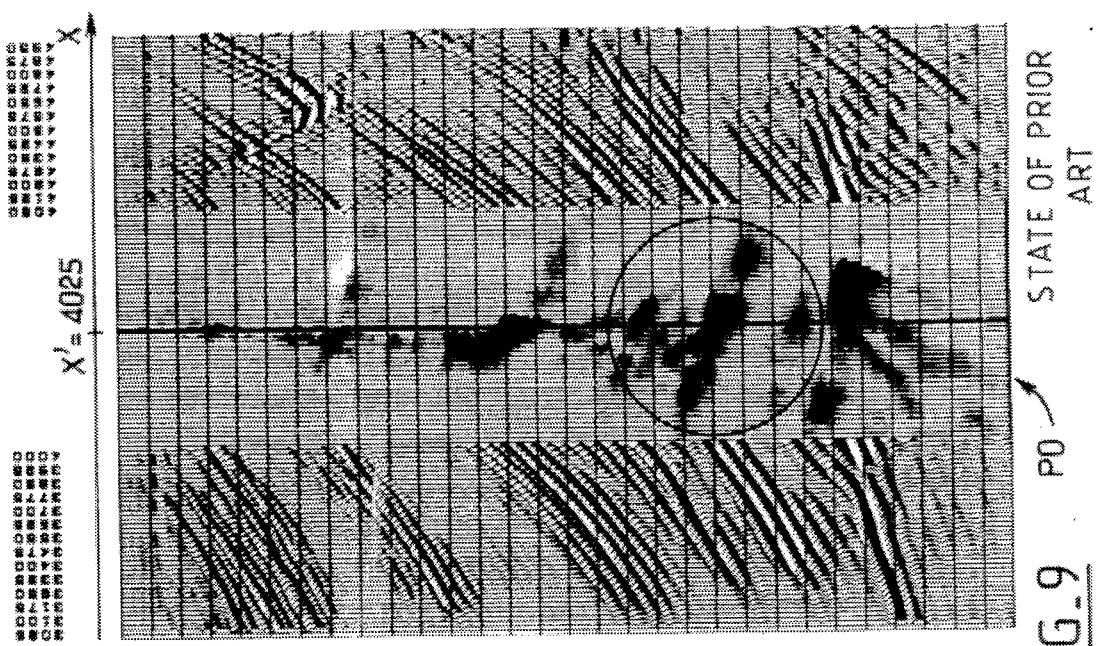
FIG_9 STATE OF PRIOR ART

METHOD OF IMPROVING AN ESTIMATE OF SEISMIC WAVE PROPAGATION VELOCITIES BY FOCUSING ANALYSIS

The present invention relates to a method of processing seismic data for the purpose of improving an estimate of the propagation velocities of seismic waves underground by analyzing focusing.

BACKGROUND OF THE INVENTION

In general, seismic prospection consists in emitting seismic waves into underground formations by means of one or more seismic sources, and in using sensors such as geophones or hydrophones to record seismic data corresponding to seismic waves that have been reflected on underground geological interfaces (also known as "reflectors"), and then in processing said data in order to extract useful information about the underground geology.

It is conventional for the seismic source(s) and for the pressure sensors to be disposed along a prospecting line (also known as a "prospecting section"), at regular intervals when performing "2D" seismic prospecting, and at the nodes of a regular grid when performing "3D" seismic prospecting.

In order to obtain a true image of underground geology, in particular in order to establish the depth positions of reflectors, it is appropriate to process the seismic data recorded at the surface by taking account of the velocity field of seismic wave propagation underground, and in particular by taking account of variations in propagation velocities laterally and as a function of depth.

The usual treatment of seismic data is known as "multi-offset migration" or as "prestack migration" and, in extremely simplified outline, it consists in assuming, a priori, a field of propagation velocities for seismic waves underground, and then in calculating for each source-sensor pair on the surface, fictional recordings that would have been obtained by means of fictional sources and sensors situated at greater or lesser depths on the path of the seismic waves emitted and received by each source-sensor pair. In practice, a large number of source-sensor pairs situated at adjacent abscissa intervals over the prospecting section are treated simultaneously and the calculated fictional recording at any given point takes account of the contribution from all of the seismic sources disposed on the surface.

The image of the underground formations is obtained by applying special space and time conditions known as "imaging conditions" to the set of fictional recordings, where the time condition corresponds to time zero, while the space condition corresponds to fictional sources and sensors that coincide at points having the same abscissa on the prospecting section and referred to as the "zero offset extrapolation point", and having respective depths known as the "extrapolation depths". When the space and time conditions are implemented at the same extrapolation points, such a point is said to be the "imaging point" and the corresponding extrapolation depth is said to be the "imaging depth".

When the velocity field used in the extrapolation corresponds to the real velocity field, then the imaging depth of an imaging point corresponds to the exact depth of the reflector, and otherwise, any error in the assumed velocity field gives rise to an error in the depth position of the imaging point relative to the real depth of the reflector.

In order to facilitate estimating the field of seismic wave propagation velocities underground, proposals were made in 1986, in particular in the articles "Prestack migration velocities from depth focusing analysis", 56th Annual International Meeting of the Society of Exploration Geophysics, Expanded Abstracts 438–440, and "2D prestack depth migration in the (S-G-W) domain", 56th Annual International Meeting of the Society of Exploration Geophysicists, Expanded Extracts 327–330, to establish a focusing data volume while conserving the extrapolated data corresponding to a zero offset and to a time interval that is not reduced to zero. That time interval is then converted into a depth positioning error for the zero offset extrapolation points, thereby constituting a focusing panel at constant abscissa on the prospecting section. By concentrating on the energy maxima of said focusing panels using a technique known as "depth focusing analysis" and described in particular in the article "Depth focusing analysis": Practical Applications and Potential Pitfalls, 61th International Meeting of the Society of Exploration Geophysicists, Expanded Abstracts 1222–1225 and the bibliography mentioned in that article, it is possible to estimate a new velocity field which, by reiterating the above-mentioned extrapolation process, makes it possible to obtain an image of underground geology that is closer to reality.

Nevertheless, in known treatment methods, the above-mentioned time interval is converted into an error in depth positioning without taking account of lateral variations in the velocity field, nor of the slope of the reflectors.

It is then difficult to act accurately on the energy maxima of the focusing panels, such that any improvement in the estimate of the velocity field that results therefrom is small and does not always justify the cost of the computation performed.

OBJECTS AND SUMMARY OF THE INVENTION

An object of the present invention is to provide a method of processing seismic data that takes account of lateral variations and of depth variations in the propagation velocity field of seismic waves underground, and that also takes account of the slope of reflectors, thereby improving the quality of the focusing panels that are made up, and thus obtaining a more accurate estimate of the propagation velocity field of seismic waves underground. More particularly, the invention seeks to provide a method of processing seismic data in which a volume of focusing data is made up in conventional manner from downwards extrapolation over a given set of extrapolation depths, of surface seismic data obtained by at least one seismic source and sensors that are uniformly disposed in the abscissa direction along a prospecting section.

At this stage, the focusing data is referred to as "raw" focusing data. By construction, the raw focusing data satisfies the zero offset condition. The products of applying the method of the invention to such raw focusing data are referred to as "migrated" focusing data.

According to a characteristic of the invention, for a subset of said volume of raw focusing data corresponding to a given extrapolation depth and over a contiguous interval of abscissas along the prospecting section, the method comprises the steps consisting in:

a) performing zero offset downwards migration on said subset of raw focusing data to a first set of imaging depths greater than said extrapolation depth and applying a selected time condition to the migrated data in order to constitute a first block of focusing analysis migrated data;

b) performing inverse zero offset migration in an upwards direction on said subset of raw focusing data to a second set of imaging depths less than said extrapolation depth, and applying a selected time condition to the migrated data in order to constitute a second block of focusing analysis migrated data;

c) uniting the first and second blocks of focusing analysis migrated data obtained for each extrapolation depth of said subset in order to constitute a volume of focusing analysis migrated data; and constructing a focusing panel by extracting a subset at constant abscissa from said volume of focusing analysis migrated data, said focusing panel subsequently being processed in conventional manner by focusing analysis in order to obtain an improved estimate of seismic wave propagation velocities underground.

The dimensions of the volume of raw focusing data are preferably time frequency, extrapolation depth, and abscissa along the prospecting section. In a variant, the dimensions of the volume of raw focusing data may be time or time frequency, extrapolation depth or extrapolation pseudo-depth, and abscissa along the prospecting section, where pseudo-depth is equivalent to a depth expressed in another unit, e.g. vertical travel time.

The dimensions of the volume of migrated focusing analysis data are preferably imaging depth (after migration to zero offset), extrapolation depth, and abscissa along the prospecting section.

In a variant, the dimensions of the volume of migrated focusing analysis data are imaging pseudo-depth, extrapolation pseudo-depth, and the abscissa along the prospecting section.

Downwards extrapolation of the seismic data is performed by any method that enables a wave field at a given depth to be reconstituted from a multiple offset field of waves recorded at the surface. Preferably, the downwards extrapolation of the seismic data is performed using at least one of the methods in the following list: Kirchhoff, finite differences, wavenumber-frequency.

The raw focusing data is migrated to zero offset with any known method of migration to zero offset. Preferably, the zero offset migration of the raw focusing data is performed using at least one of the methods in the following list: Kirchhoff, finite differences, wavenumber-frequency.

BRIEF DESCRIPTION OF THE DRAWINGS

Other characteristics and advantages of the present invention appear on reading the following non-limiting description of the invention and on examining the accompanying drawings, in which:

FIGS. 1 to 4 show how migration is performed by the "source-sensor multiple-offset" wave equation;

FIG. 5 is a diagram showing a volume of raw focusing data;

FIG. 6 is a diagram of a section at a given extrapolation depth through the volume of raw focusing data shown in FIG. 5;

FIGS. 9 and 10 show two focusing panels respectively as obtained by a known method and as obtained by the method of the invention.

MORE DETAILED DESCRIPTION

Figure 11:
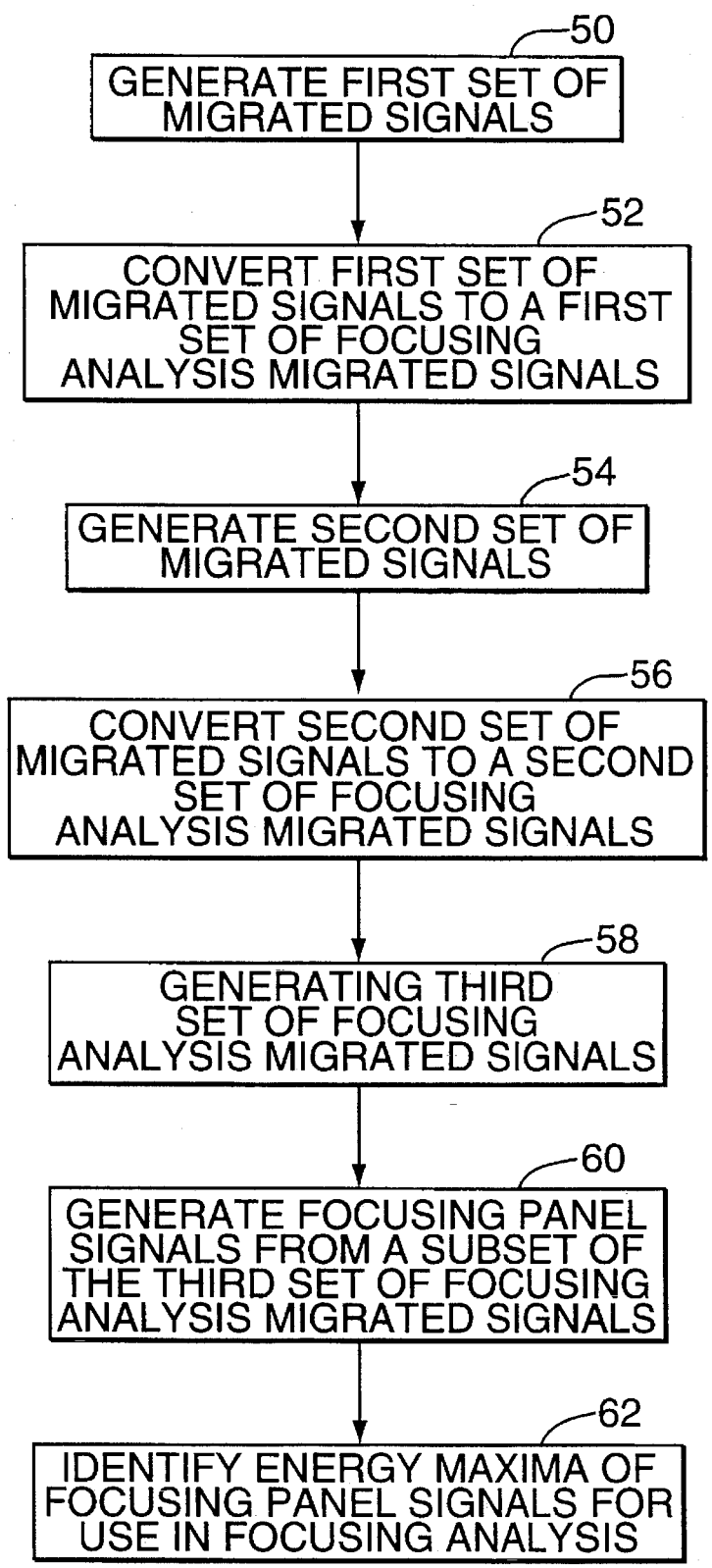
FIGS. 11 is a flowchart illustrating the method of utilizing received seismic waves so as to estimate the propagation velocities of seismic waves underground in accordance with the present invention.

The method of processing seismic data of the present invention, illustrated by the flowchart 48 or FIG. 11, applies more particularly to a volume of raw focusing data that is obtained in conventional manner by extrapolating downwards ("datuming") by the wave equation of a seismic wave field observed at the surface, by a method of migration prior to addition with multiple source-sensor offsets ("prestack migration" or "multi-offset migration"). The extrapolation is preferably performed by means of a finite difference algorithm using a 45° or 65° paraxial approximation of the wave equation.

The following description made with reference to FIGS. 1 to 4 outlines very briefly how the above-mentioned volume of raw focusing data is constituted. It is useful to refer to the publications mentioned above. In order to facilitate understanding of the invention, the description refers to the following dimensions: time (t), abscissa (X) measured along the prospecting section, and extrapolation depth (Z). In practice, and in order to facilitate computer processing of the data, it is preferable to use Fourrier transforms of the recordings obtained at the surface and thus to work in the time frequency dimension instead of in the time dimension.

Reference 1 designates a seismic source that generates pressure waves or seismic waves 5 that propagate downwards through the ground, and reference 2 designates a sensor such as a geophone for recording variations in pressure P corresponding to seismic waves 6 as reflected by an underground reflector 8. The source 1 and the geophone 2 are located at respective abscissas S and G on a horizontal line or prospecting section 3 which is taken as the reference from which depth Z is measured.

For a given pair of source 1 and sensor 2, and on the basis of an a priori assumption of a seismic wave propagation velocity field underground, the wave equation is used step by step downwards to calculate fictional recordings P(S',G', Z,t) depending at depth Z and at time t, as they would have been obtained by placing a fictional source 1' at abscissa S' and a fictional sensor 2' at abscissa G', at the depth Z, and on the path of the seismic waves emitted at the surface by the source 1 at abscissa S and received by the sensor 2 at abscissa G, as shown in FIGS. 1 and 2.

More particularly, the step by step calculation is performed as follows.

In a first step, illustrated by FIG. 3, the fictional recording is calculated that would have been obtained by placing the geophone 2' at depth Z+dZ. Thereafter, as illustrated by FIG. 4, by inverting the roles of the source and of the geophone, the fictional recording is calculated that would have been obtained by placing the source 1' at the depth Z+dZ. Applying a particular time condition (time t=0), the offset between the abscissas S' of the fictional source 1' and G' of the fictional geophone 2' becomes progressively smaller as the wavefield is extrapolated downwards, and the fictional source 1' and the fictional geophone 2' coincide (zero offset S'=G'=X) at an extrapolation point that is referred to below as the "zero offset focusing point Fi" at abscissa $X_{Fi}$ on the prospecting section, and situated at a depth referred to as the "extrapolation depth". The condition (t=0) and (S'=G'=X)

are called the "imaging" conditions. If the seismic wave propagation velocity field used in the calculation corresponds to the real field, then the depth of the focusing point Fi corresponds to the real depth of the reflector. Otherwise, the depth of point Fi is offset from the real depth of the reflector.

The raw focusing data is constituted by saving those fictional recordings that satisfy the zero offset condition in a non-zero interval in the time dimension about zero. The set of focusing data corresponding to different extrapolation depths Ze constitutes a volume of raw focusing data.

A volume 10 of raw focusing data as obtained in the conventional manner described above is shown diagrammatically in FIG. 5. This volume of raw focusing data has an abscissa dimension X measured along the prospecting section, an extrapolation depth dimension $Z_e$, and a time dimension t.

The volume 10 of raw focusing data shown in FIG. 5 was obtained for a given prospecting section and for a given set of extrapolation depths $Z_e$, by retaining those fictional recordings that are at zero offset over a time interval lying in the range −tau to +tau P(X,−tau≦t≦+tau, $Z_e$). The reference 20 designates a subset of this volume of focusing data corresponding to a given extrapolation depth $Z_e$, this subset being referred to below as the "zero offset focusing plane" (also known in the art as the "zero offset migrated plane"). This plane contains a set of focusing points $F_0, \ldots, F_i, \ldots, F_n$ also known as "imaging points".

FIG. 6 shows half-plane 20a of the subset 20 corresponding to those fictional recordings that have times that are greater than zero but less than tau.

The invention relies on treating the set of points $F_i$ situated at extrapolation depth $Z_e$ as a set of sources and sensors that coincide and that are placed on the surface along a horizontal prospecting line.

Figure 7:
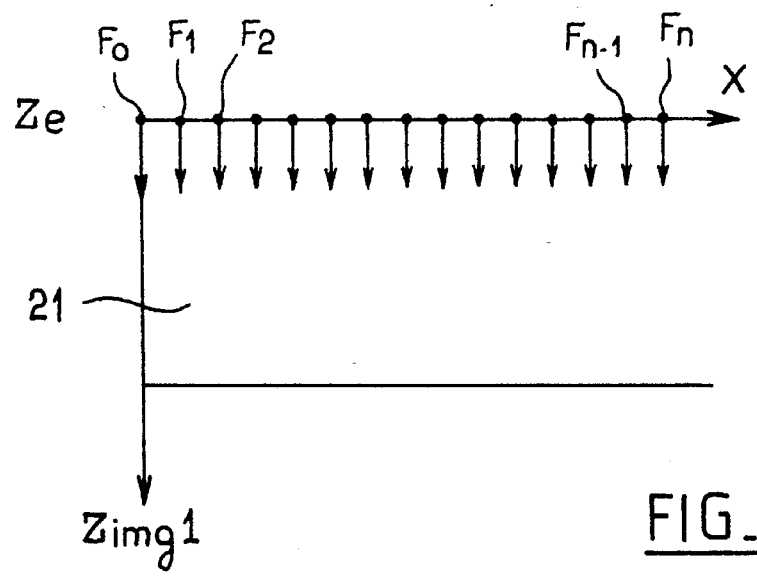
FIG. 7 is a diagram of the section of FIG. 6 migrated downwards, in application of the method of the present invention.

According to the invention, as shown in FIG. 7, and for a contiguous set of focusing points $F_i$, the zero offset focusing half-plane 20a is used to constitute a first block 21 of focusing analysis migrated data by using the "zero offset migration method" to extrapolate the fictional recordings that would have been obtained by placing the sources and the sensors at a greater depth, i.e. by migrating the set of contiguous points $F_1$ downwards ("back propagation") down to an imaging depth $Z_{img1}=Z_e+Z_{au}$ that is greater than the extrapolation depth $Z_e$, as shown by step 50, and by applying the time condition t=0 to the data migrated in this way, as shown by step 52.

According to the invention, a second block of migrated data is constituted by performing inverse migration on the above-mentioned contiguous set of points $F_0, \ldots, F_n$, but upwards ("propagation") up to an imaging depth as shown by step 54, and applying the time condition t=0 to the data migrated in this way, as shown by step 56 $Z_{img2}=Z_e-Z_{au}$ that is less than the extrapolation depth.

Figure 8:
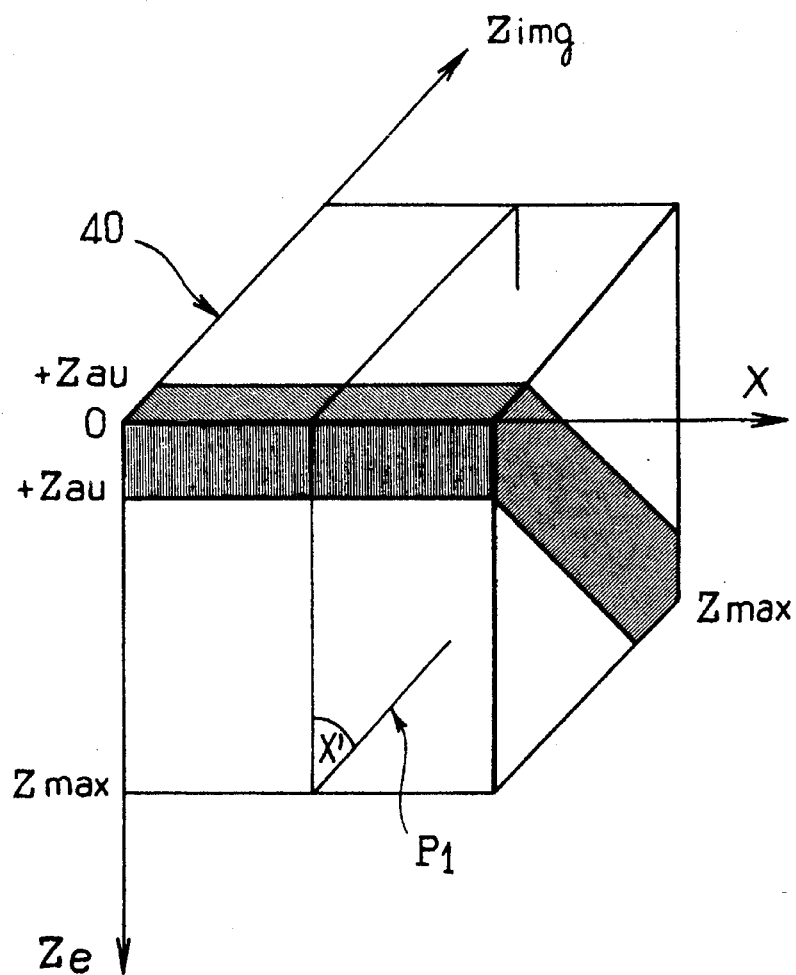
FIG. 8 is a diagrammatic view of the volume of migrated focusing analysis data obtained by the method of the invention.

The two blocks of migrated data constituted in this way are then united, as shown by step 58, and the process is repeated for a set of extrapolation depths Ze so as to constitute a volume of focusing analysis migrated data given reference 40 in FIG. 8.

This volume of focusing analysis migrated data has an extrapolation depth dimension $Z_e$ (also referred to as the focusing depth), an imaging depth dimension $Z_{img}$, and an abscissa dimension X measured along the prospecting section.

Thereafter, as shown by step 61, a section is made in a plane of constant horizontal position X' to constitute a focusing panel P1 and the data in this focusing panel is organized in conventional manner, in particular by change of variable, to dispose the imaging depth $Z_{img}$ vertically along the ordinate and to dispose the focusing error e horizontally where e=$(Z_{img}-Z_e)/2$, as shown in FIGS. 9 and 10.

FIG. 9 shows an example of a focusing panel P0 obtained using a known prior art method.

FIG. 10 shows an example of a focusing panel P1 obtained by the method of the invention.

On either side of the focusing panels P0 and P1, there are images of the underground formations corresponding to abscissa positions along the prospecting position that are respectively less than and greater than the abscissa indicated by the central vertical lines which show zero depth positioning error on each of the focusing panels at abscissa X' (abscissa dimensions are given in meters). In the focusing panels P0 and P1, there can be seen dark patches which corresponds to high energy amplitudes in the extrapolated seismic data.

In conventional manner, as shown by step 62, focusing analysis consists in acting on the energy maxima of the spots that appear in the focusing panels to deduce therefrom information enabling the estimate of seismic wave propagation velocities through the ground to be corrected.

On comparing the circled portions of these figures the person skilled in the art will readily understand that it is easier to act on the energy maxima in the focusing panel obtained in accordance with the invention, since said spots are less dispersed about the central axis.

Finally, the invention makes it possible to achieve a considerable improvement in the estimate of seismic wave propagation velocities obtained by prestacking migration and focusing analysis, thus making it easier to act on the energy maxima of the focusing panels.

The invention has been described with reference to so-called "2D" seismic prospecting. Naturally, application to "3D" seismic prospecting is not outside the ambit of the present invention. Under such circumstances, the abscissa X along the prospecting section is accompanied by an ordinate dimension Y.

I claim:

1. A method of utilizing received seismic waves so as to estimate the propagation velocities of seismic waves underground in which a seismic source and sensors are regularly disposed along a prospecting section at abscissas, the seismic source generates seismic waves into an underground area and the sensors detect the seismic waves that have been reflected by underground geological interfaces present in the underground area, each of the sensors generates sensor signals which are indicative of the seismic waves reflected by the underground geological interfaces which are received by the sensor, an arrangement for processing the sensor signals generates a set of raw focusing signals indicative of the received seismic waves detected by the sensors extrapolated to a plurality of extrapolation depths, and wherein for a plurality of raw focusing signals each corresponding to the received seismic waves extrapolated to one of the plurality of extrapolation depths and over a contiguous interval of abscissas along the prospecting section, the method comprising the steps of:

generating for each said extrapolation depth a first set of migrated signals indicative of said raw focusing signal which is zero offset downwards migrated to a first set of imaging depths greater than said extrapolation depth;

converting said first set of migrated signals to a first set of focusing analysis migrated signals which are indicative of said first set of migrated signals to which a selected time condition has been applied;

generating for each said extrapolation depth a second set of migrated signals indicative of said raw focusing signal which is inverse zero offset upwards migrated to a second set of imaging depths less than said extrapolation depth;

converting said second set of migrated signals to a second set of focusing analysis migrated signals which are indicative of said second set of migrated signals to which a selected time condition has been applied;

generating a third set of focusing analysis migrated signals in accordance with said first and second sets of focusing analysis migrated signals which are generated for each of said plurality of extrapolation depths;

generating focusing panel signals which are indicative of a subset of said third set of focusing analysis migrated signals which are at given abscissa; and identifying the energy maxima of said focusing panel signals in order to perform focusing analysis on said focusing panel signals to estimate the propagation velocities of said seismic waves underground.

2. A method according to claim 1, wherein the set of raw focusing signals are indicative of the following dimensions of the detected seismic waves extrapolated to given extrapolation depths: time frequency, extrapolation depth, and abscissa along the prospecting section.

3. A method according to claim 1, wherein the set of raw focusing signals are indicative of the following dimensions of the detected seismic waves extrapolated to given extrapolation depths: time frequency, extrapolation depth expressed as a vertical time scale, and abscissa along the prospecting section.

4. A method according to claim 1, wherein the set of raw focusing signals are indicative of the following dimensions of the detected seismic waves extrapolated to given extrapolation depths: time, extrapolation depth, and abscissa along the prospecting section.

5. A method according to claim 1, wherein the set of raw focusing signals are indicative of the following dimensions of the detected seismic waves extrapolated to given extrapolation depths: time, extrapolation depth expressed as a vertical time scale, and abscissa along the prospecting section.

6. A method according to claim 1, wherein said third set of focusing analysis migrated signals are indicative of the following dimensions: imaging depth, extrapolation depth, and abscissa along the prospecting section.

7. A method according to claim 1, wherein said third set of focusing analysis migrated signals are indicative of the following dimensions: imaging depth expressed as a vertical time scale, extrapolation depth expressed as a vertical time scale, and abscissa along the prospecting section.

8. A method according to claim 1, wherein said set of raw focusing signals are indicative of the received seismic waves detected by the sensors extrapolated to a plurality of extrapolation depths, said extrapolation performed using at least one of the methods in the following list: Kirchhoff, finite differences, wave number-frequency.

9. A method according to claim 1, wherein said first set of migrated signals are indicative of said raw focusing signal which is zero offset downwards migrated to said first set of imaging depths, said zero offset downwards migration performed using at least one of the methods in the following list: Kirchhoff, finite differences, wave number-frequency.

10. A method according to claim 1, wherein the abscissa X along the prospecting section is accompanied by an ordinate dimension Y.

11. A method according to claim 1, further comprising the step of generating an image indicative of the relative amplitudes of said focusing panel signals.

12. A method according to claim 1 further comprising the step of processing the signals with the velocity field thus obtained to extract information about the underground geology.

* * * * *

UNITED STATES PATENT AND TRADEMARK OFFICE
CERTIFICATE OF CORRECTION

PATENT NO : 5,579,281
DATED : November 26, 1996
INVENTOR(S): Francois Audebert

It is certified that error appears in the above-identified patent and that said Letters Patent is hereby corrected as shown below:

Column 1

Line 21, delete "pressure".

Column 4

Line 9, delete "or" and substitute --of--.

Column 5

Lines 51-53, move "as shown by step 54, and applying the time condition t=0 to the data migrated in this way, as shown by step 56" to line 54 after the word "depth".

Line 66, "61" should be "60".

Signed and Sealed this

Eleventh Day of March, 1997

Attest:

BRUCE LEHMAN

Attesting Officer　　Commissioner of Patents and Trademarks

UNITED STATES PATENT AND TRADEMARK OFFICE
CERTIFICATE OF CORRECTION

PATENT NO. : 5,579,281
DATED : November 26, 1996
INVENTOR(S) : François Audebert It is certified that error appears in the above-indentified patent and that said Letters Patent is hereby corrected as shown below:

On the title page, item [75] inventor, should read --François Audebert--.

Signed and Sealed this

Twenty-second Day of April, 1997

Attest:

BRUCE LEHMAN

*Commissioner of Patents and Trademarks*

*Attesting Officer*